May 10, 1960  J. F. McCLEAN  2,936,426
FILTER NETWORK

Filed May 2, 1955  4 Sheets-Sheet 1

*INVENTOR.*
JOSEPH F McCLEAN
BY
Leonard H. King
AGENT

May 10, 1960 J. F. McCLEAN 2,936,426
FILTER NETWORK
Filed May 2, 1955 4 Sheets-Sheet 2

INVENTOR.
JOSEPH F MC CLEAN
BY
Leonard H. King
AGENT

INVENTOR.
JOSEPH F. McCLEAN
BY
Leonard H. King
AGENT

United States Patent Office 2,936,426
Patented May 10, 1960

2,936,426

FILTER NETWORK

Joseph F. McClean, Goshen, N.Y.

Application May 2, 1955, Serial No. 505,459

20 Claims. (Cl. 330—91)

This invention relates to frequency selective networks, and in particular to frequency selective networks including and employing active circuit elements.

Frequency selective networks are commonly employed in the electrical art for the selection of desired waves and suppression of undesired waves, said desired and undesired electrical waves differing in periodicity. They are also employed in various related ways to alter the time phase relationships of the components of complex electrical waves. Frequency selective networks of the prior art include both active and passive varieties, the latter being distinguished by the inclusion of two or more of the basic impedance elements (i.e. resistance, capacitance, and inductance), and the absence of sources of energy excepting that provided by the driving source to the input terminals of the network. Contrastingly, the active varieties, while also composed of two or more of the basic impedance types (i.e. inductance, capacitance and resistance), may also include additional sources of energy over and above that supplied by the driving source to the input terminals, such energy being introduced by vacuum tubes or analogous translating devices.

A common object in the employment of active elements in filter networks is the attainment of properties characteristic of passive networks composed of all three types of the basic circuit elements (i.e. resistance, capacitance and inductance) while restricting the active counterpart to resistance and but one or the other type of reactance. Such restricting of element character becomes important where it is desirable, or even mandatory, to avoid the use of one type of reactance.

A common example occurs in the design of electrical filters for extremely low frequencies, for which practicable inductors are difficult or impossible of design. Inductances may also become impractical from the point of view of size at low audio and at sub-audible frequencies. For such application the realization of filters which avoid use of inductances is attractive.

Another practical problem solvable by the use of active filters, and in particular by the use of active filters within the scope of this invention, arises when it is desired to alter the cut-off frequency in response to an electrical control signal without recourse to mechanical tuning means. When such control is attempted in passive filters employing both capacitive and inductive elements by the incorporation of electrically varied reactors (including such devices as flux saturable inductances), severe design complications result, first because of the fact that impedances, both internal and terminal, of passive filters are altered by inductance-capacitance ratio changes accompanying tuning variation of the control elements and, second from the changing "Q-factor" accompanying variation of such elements with electrical control. The former effect can be avoided only by simultaneous variation of both inductance and capacitance in correct ratio, a difficult feat with simple filters at best. The undesirable second effect, equivalent to change in dissipation factor of the variable reactance device, causes changes of the cut-off, or "corner," characteristic of the so-tuned filter, which must be accepted. When, on the other hand, such tuning is accomplished employing electrically controllable reactances in the active filters of this invention, the impedance effects may be avoided entirely and the "Q" change effect compensated by simple means.

It has been established practice of the prior art to synthesize a desired filter transfer function by the insertion of networks, comprised entirely of resistance and but one type of reactance, in the feedback loop of an amplifier. Such amplifiers are normally designed to possess voltage gains considerably in excess of unity, the feedback path being predominately negative and responsible for the overall frequency selectivity.

The methods of the present invention are to be distinguished from such means of the prior art, as will become apparent from the description to follow.

It is an object of the present invention to provide active networks capable of transfer functions commonly attainable only with passive circuits employing resistance, capacitance and inductance, and which do so with elements restricted to resistance and but a single type of reactance.

It is another object of the present invention to provide active networks having transfer functions identical with or closely resembling those of passive networks comprised of resistance, capacitance and inductance, and commonly referred to as "constant-k" networks, which may be described as possessing bands of substantially uniform transmission, termed "pass bands," and bands of uniformly decaying transmission, in which the rate of transmission decay may be specified as so many decibels of transmission decay per octave of frequency removal from the pass band, while again restricting circuit elements to resistance and but a single type of reactance.

Still another object of this invention is to provide a new and improved oscillator.

A further object of this invention is to provide an oscillator arranged so that the frequency of its output signal may be controlled by the variation of the ohmic values of resistances.

A particular object of this invention is to provide a frequency selective filter network having the characteristics of a circuit incorporating resistance, capacitance and inductance wherein the transition, or cut-off frequency may be selected by varying only resistance elements in said network.

A further object of this invention is to provide filter networks capable of extremely rapid cut-off rate.

A further object is to provide a filter circuit having means to adjust its "Q" or so-called "damping" factor.

A general object of this invention is to provide a frequency selective filter network having the characteristics of a circuit incorporating impedance elements of resistance, capacitance and inductance types, wherein the transition or cut-off frequency may be selected by varying only one of said named types of impedance elements.

Another object of this invention is to provide a frequency selective filter network having the characteristics of a circuit incorporating resistance, capacitance and inductance wherein the transition or cut-off frequency may be selected by varying only electrical signals applied to electrically variable inductive reactors.

Other objects and advantages will be pointed out with particularity and still others will become apparent from consideration of the following description studied in conjunction with the accompanying drawings in which like reference characters are used to designate similar or corresponding parts.

For networks in accordance with this invention, the transmission will be expressed in terms of the "complex voltage transfer ratio," which is here defined as the vector ratio of the voltages appearing respectively at the output and input terminals. This convention will be followed as one most conveniently demonstrating the important equivalences to passive filter networks which make the active networks of this invention desirable alternatives. In this regard it should be noted that certain important practical differences exist between the active networks and their passive counterparts, which may be used to advantage. Passive networks are in general bilateral (i.e. input and output terminals may be interchanged with respect to transmission direction), whereas active networks are in general unilateral and transmit in one direction only. The design of passive networks is generally complicated by necessity for considering impedance conditions not only between input terminals and source and between output terminals and load, but between internals of a multisection filter. Active networks, to a great extent, are relieved of these restrictions and may be treated on the basis of voltage transfer alone, with impedance considerations at terminals reduced to a matter of maintaining high, or "bridging," values at input terminals and low values at output terminals, relative respectively to the source and load impedances, considered at the cut-off frequency of the network.

By "cut-off frequency," as used herein, is meant that frequency at which a predefined finite degree of attenuation is attained relative to the degree of transmission prevalent for pass band frequencies.

Figure 1:
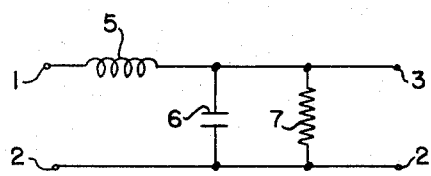
Figure 1 shows schematically a simple network, commonly known as an "L-section," composed of resistance, capacitance and inductance and exhibiting frequency selective properties of a low pass nature.

Referring to Figure 1, the circuit there shown represents a form of passive low pass filter, in which 1 and 3 are respectively input and output terminals and 2 is a terminal common to both input and output circuits such as "ground." The inductance 5 is connected between the input terminal 1 and the output terminal 3, while the capacitance 6, paralleled by the resistance 7, is connected from the output terminal 3 to the common terminal 2. The network of Figure 1 is a simple type, shown here solely for purposes of illustration and may be shown to have a complex voltage transfer ratio:

(Equation Ia) $\quad \dfrac{l_o}{l_1}=\dfrac{S}{MP^2+NP+1}$ in which $P=jw$; $S=1$; $M=LC$; and $N=L/R$, $j=\sqrt{-1}$; $w$=angular frequency; L, C and R representing respectively the magnitudes of the inductance 5, the capacitance 6 and the resistance 7.

Figure 2:
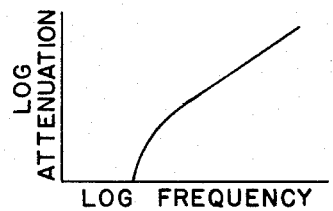
Figure 2 shows a typical frequency response curve for the circuit of Figure 1, plotted on a logarithmic scale.

The curve of attenuation vs. frequency for the filter of Figure 1 is shown in Figure 2.

Figure 3:
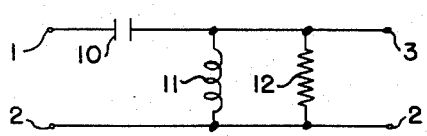
Figure 3 is a schematic diagram of another common network which is the high pass analog of the network of Figure 1.

Figure 3 represents a circuit which is the high pass analogy of the circuit of Figure 1 in which 1 and 3 are respectively input and output terminals and 2 is a terminal common to both input and output loops. The capacitance 10 is connected between the terminal 1 and 3 while the inductance 11, paralleled by the resistance 12, is connected from the output terminal 3 to the common terminal 2. The network of Figure 3 may be shown to offer a voltage transfer expressed by:

(Equation Ib) $\quad \dfrac{l_o}{l_1}=\dfrac{SP^2}{MP^2+NP+1}$ in which the coefficients M and N are identical with those given above for Equation Ia describing the circuit of Figure 1 while the coefficient S is taken as $$S=LC$$

Figure 4:
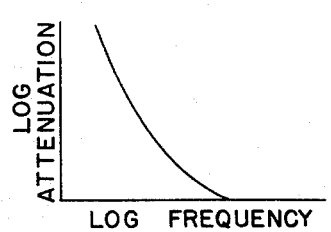
Figure 4 shows a typical frequency response curve for the circuit of Figure 3 plotted on a logarithmic scale.

The variation of attenuation with change in frequency for the high pass filter of Figure 3 is shown in Figure 4.

Figure 5:
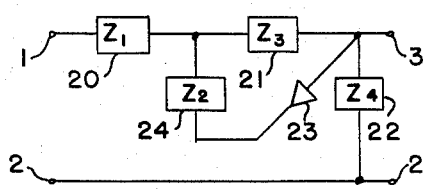
Figure 5 is a schematic drawing of a more general representation of the networks shown in Figure 6 and Figure 7.
Figure 6:
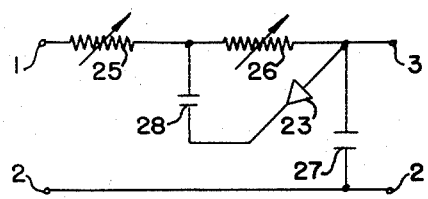
Figure 6 shows an embodiment of the principles of this invention, exhibiting low pass characteristics.

Figure 5 is a generalized form of network within the scope of this invention, whose low pass, specialized form is shown in Figure 6. A specialized high pass form appears in Figure 7. Referring to Figure 5, the terminal 1 and the common terminal 2 comprise input terminals of the network. The impedance 20 in series with the impedance 21 forms a connection between the input terminal 1 and the output terminal 3. An impedance 22 is connected between the output terminal 3 and the common terminal 2. The output terminal 3 is also connected to the input side of the active unilateral translating device 23 which meets the requirements set forth hereinafter for such devices. The translating device exhibits negligible input admittance and negligible output impedance at the cut-off frequency of the network and maintains a relationship between its input and output voltages expressible as a simple, dimensionless, numerical ratio $\times k$. An impedance 24 is connected between the output terminal and the junction of the impedances 20 and 21 thus completing the circuit.

An analysis of the circuit of Figure 5 leads to an expression for the complex voltage transfer ratio in terms of the several circuit impedances and the gain constant $k$ of the active unilateral translating device:

(Equation II)

$$\dfrac{l_o}{l_1}=\dfrac{1}{1+(1-k)\dfrac{Z_1}{Z_2}+\dfrac{Z_1+Z_3}{Z_4}+\dfrac{Z_1Z_3}{Z_2Z_4}}$$

where $Z_1$, $Z_2$, $Z_3$ and $Z_4$ are the impedances of the circuit elements 20, 24, 21 and 22 respectively, and $k$ is the gain constant of the active unilateral translating device 23. A particularly useful form of this network results when $Z_1=Z_3=Z$ and the impedances $Z_2$ and $Z_4$ are so related that $Z_4/Z_2=a^2$, the constant "$a$" being a dimensionless number, and $Z_2 Z_4 = Z^2_m$ (i.e. a quantity $Z_m$ is the geometric mean of the impedances $Z_2$ and $Z_4$). In this case the Equation II reduces to the following:

(Equation III)
$$\frac{l_0}{l_1}=\frac{1}{1+(1-k)\frac{aZ}{Z_m}+\frac{2}{a}\frac{Z}{Z_m}+Z^2}$$

Referring to Figure 6, the impedances 20 and 21 of Figure 5 become respectively the resistances 25 and 26; the impedances 22 and 24 become respectively the capacitors 27 and 28, and the complex voltage transfer ratio becomes (Equation IV) $\quad \frac{l_0}{l_1}=\frac{S^1}{M^1P^2+N^1P^2+1}$ in which the coefficients are given by: $M^1=R^2C^2$;

$$N^1=\left[\frac{2}{a}+(1-k)a\right]RC$$

and $S^1=1$ where, $R_1=R_3=R$; $C=\sqrt{C_2C_4}$ and $$a=\sqrt{\frac{C_2}{C_4}}$$

Figure 7:
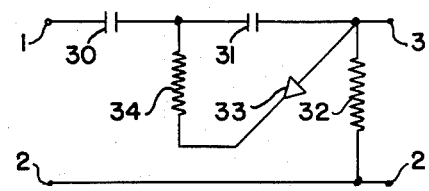
Figure 7 shows schematically a related network which exhibits high pass characteristics, analogous to the network of Figure 7.

In a similar manner, in Figure 7 the impedances 20 and 21 of Figure 5 become respectively the capacitances 30 and 31, while the impedances 22 and 24 of Figure 5 become respectively the resistances 32 and 34. In this case the complex voltage transfer ratio of the circuit of Figure 7 may be expressed as follows:

(Equation V) $\quad \frac{l_0}{l_1}=\frac{S''P^2}{M''P^2+N''P+1}$ in which the coefficients are given by: $M''=R^2C^2$;

$$N''=\left[\frac{2}{a}+(1+k)a\right]RC$$

and $S'=R^2C^2$ where $C_1=C_2=C$; $R=\sqrt{R_2R_4}$ and $$a=\sqrt{\frac{R_4}{R_2}}$$

In the Equations IV and V, P is again defined as above. The low pass Equation IV, applying to the circuit of Figure 6, will be seen by inspection to be identical in form to the Equation I$a$ defining the voltage transfer ratio of the circuit of Figure 1 and differing therefrom only as respects the particular values of coefficients. By suitable adjustment of the circuit parameters $a$ and $k$, the transfer ratios may be made identical, or such adjustment may be used to match the characteristics of other circuits displaying this form of transfer equation, exemplified by the Equation I$a$ and having the salient characteristics of (1) a pass band of substantially uniform transmission, (2) a stop band of substantially uniform transmission decay at the rate of 12 decibels per octave and (3) a transition, or "corner," in which transmission is determined largely by the coefficient N.

In a manner directly analogous, the circuit of Figure 7, by appropriate adjustment of the constants $a$ and $k$, may be made equivalent in voltage transfer ratio to the circuit of Figure 3, as expressed by Equation I$b$. With similar manipulation the transfer equation of the circuit of Figure 7 may be made equivalent to that of any circuit exhibiting such voltage transfer in the form of Equation I$b$ but differing therefrom as to coefficients.

Figure 8:
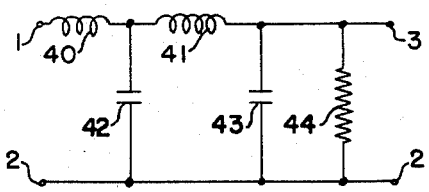
Figure 8 shows a typical low pass filter network employing resistance, capacitance and inductance elements.

Referring specifically to Figure 8, an inductance 40 is connected between the input terminal 1 and a second identical inductance 41, the junction of said inductances 40 and 41 being common with a terminal of a capacitance 42, whose other terminal is joined with the common input-output terminal 2. The said second inductance 41 is connected to the output terminal 3 to which are also joined a second capacitance 43 and a resistance 44, said capacitance and resistance being connected in parallel and having a common terminus in the input-output terminal 2. The circuit configuration of Figure 8 may be analyzed for the complex voltage transfer ratio between the specified input and output terminals:

(Equation VI)
$$\frac{l_0}{l_1}=\frac{1}{A'P^4+B'P^3+C'P^2+D'P+1}$$

where the coefficients are defined as follows: $A'=L^2C^2$;

$$B'=\frac{L^2C}{R}$$

$C'=3LC$;

$$D'=\frac{2L}{R}$$

and P is the product of the angular frequency and $\sqrt{-1}$.

The characteristic represented by the Equation VI will apply in general to passive filters having a region of uniform transmission and a region of uniformly varying attenuation with frequency, such attenuation increasing by 24 decibels per octave of frequency increment in the stop band. In practice the transfer expressions for such filters will differ principally from the example given above and from each other by the values assignable the several coefficients A', B', C' and D'.

Figure 9:
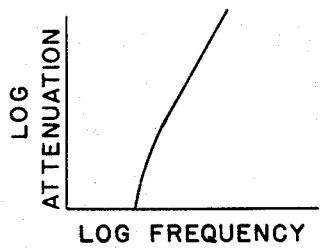
Figure 9 shows a typical frequency response curve for the circuit of Figure 8 plotted on a logarithmic scale.

Figure 9 shows a response curve of attenuation with change of frequency characteristic of the network of Figure 8.

Figure 10:
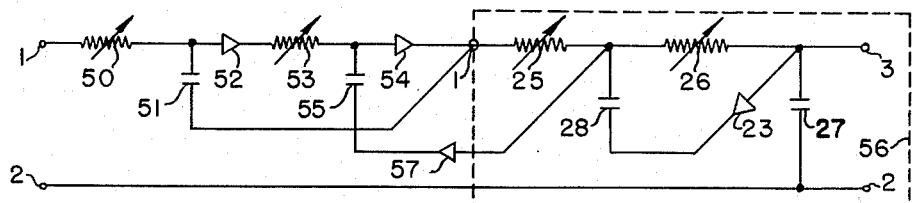
Figure 10 represents schematically an active network within the scope of this invention, exhibiting low pass characteristics.

The circuit of Figure 10 represents one embodiment of the principles of this invention, in which the terminal 1 and the common terminal 2 comprise input terminals, the terminal 3 and common terminal 2 comprise output terminals. The resistance 50 is connected between the terminal 2 and a common junction with a capacitor 51, and the input side of an active unilateral translating device 52. The resistance 53 is connected from the output terminal of device 52 to the input terminal of a similar device 54 to which is also connected one terminal of a capacitor 55. Within the dashed lines 56, there is shown the low pass filter of Figure 6. The resistance 25 is in like fashion connected from the output terminal of the device 54. This last named output terminal is also connected to the remaining terminal of the capacitor 51. The resistance 25 terminates in a junction, to which are simultaneously connected a resistance 26, a capacitor 28 and the input terminal of an active unilateral translating device 57. The output side of the device 57 is connected to the remaining terminal of the capacitor 55. The remining connection to the resistance 26 is made to the output terminal 3 from which the capacitor 27 is connected to the common terminal 2. A unilateral translating device 23, similar to the devices 52, 54 and 57 is connected with its input terminal attached to the terminal 3 and its output terminal attached to the remaining terminal of the capacitance 28 completing the circuit.

Analysis of the circuit of Figure 10 for its complex voltage transfer ratio results in the following expression:

(Equation VII)
$$\frac{l_0}{l_1}=\frac{E}{AP^4+BP^3+CP^2+DP+1}$$

in which the coefficients of the several terms are given by $E=K_1K_2$;
$A=R^4C^4$;
$B=(5-k_2k_3-k_4)R^3C^3$;
$C=(8-k_1k_2-2k_2k_3-2k_4+k_1k_2k_4)R^2C^2$;
$D=(5-k_2k_3-k_4)RC$ where the resistances 50, 53, 25 and 26 are of equal value R, the capacitances 51, 55, 28 and 27 are of equal value C and $k_1$, $k_2$, $k_3$ and $k_4$ are dimensionless constants defining the gain of the active unilateral translating devices 52, 54, 23 and 57 respectively.

By suitable choice of the gain constants $k_1$, $k_2$, $k_3$ and $k_4$ a wide range of values is possible for the several coefficients of the terms of Equation VI, permitting adjustment of the complex voltage transfer ratio of the circuit of Figure 10 to identify with that of the circuit of Figure 8 or, alternatively, with the complex voltage transfer ratio of any passive circuit containing resistance, capacitance and inductance and exhibiting such transfer ratio in the general form of Equation VI but with other values of the several coefficients therein corresponding to the values pertaining to the particular example represented by the circuit of Figure 8. The circuit of Figure 10 thus may be said to offer synthesis of low pass filters with stop band slopes of 24 decibels per octave while permitting large degree of control of the damping or "corner" characteristic, in the vicinity of cut-off. This flexibility may be employed either for the purpose of duplicating the performance of passive filters requiring resistance, capacitance and inductance or for securing desired characteristics of specific form not readily available with passive networks.

Figure 11:
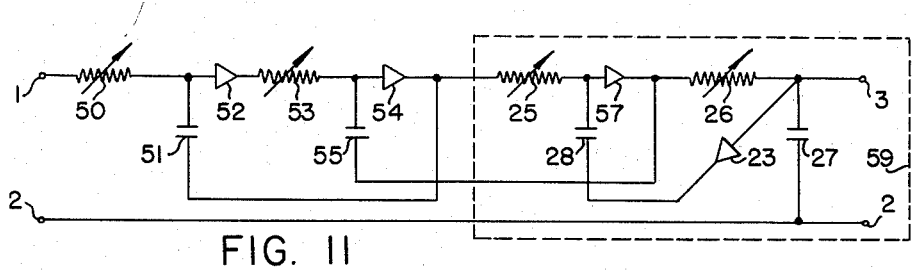
Figure 11 shows schematically a different form of active network within the scope of this invention, also possessing low pass characteristics.

Within the dashed line 59 of Figure 11 there is shown an important variation of the circuit of Figure 10 which likewise incorporates and demonstrates the principles of this invention. The description given for Figure 10 is in general applied identically to Figure 11, the sole difference applying to the connection of translation element 57 which, in the circuit of Figure 11 is interposed between resistors 25 and 26. In both cases capacitor 55 is connected to the output side and capacitor 28 is connected to the input side of the active unilateral translating device 57.

Analysis of the circuit of Figure 11 reveals a complex voltage transfer ratio of the form of Equation VII, in which the several coefficients differ from those found applicable to the circuit of Figure 10. For expressing the ratio as applying to Figure 11 the coefficients A, B, C, D and E are replaced by coefficients A'', B'', C'', D'' and E'', respectively, the latter coefficients comprising with Equation VII the transfer constant of the said circuit of Figure 11 and being defined as follows:

$A'' = R^4C^4$;
$B'' = (4 - k_1k_2 - k_2k_3 - k_3k_4)R^3C^3$;
$C'' = (6 - 2k_1k_2 - 2k_2k_3 - 2k_3k_4 + k_1k_2k_3k_4)R^2C^2$;
$D'' = (4 - k_1k_2 - k_2k_3 - k_3k_4)RC$;
$E'' = k_1k_2k_3$

Figure 12:
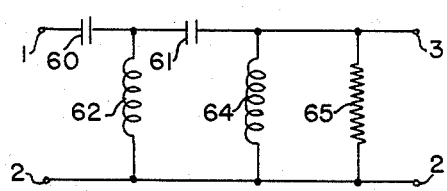
Figure 12 shows schematically a simple form of a conventional high pass filter network, analogous to the low pass counterpart of Figure 8.
Figure 13:
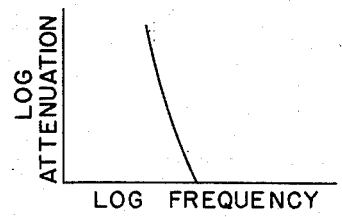
Figure 13 shows a typical frequency response curve for the circuit of Figure 12 plotted on a logarithmic scale.

The circuit shown in Figure 12 is a high pass analog of the low pass circuit of Figure 8. The corresponding response is shown in Figure 13. Referring to Figure 12 the capacitance 60 interconnects the input terminal 1 with an identical capacitor 61 and the inductance 62 is connected to the common junction of the two capacitors. The second terminal of the capacitor 61 connects with the output terminal 3 and with a second inductance 64 and a resistance 65. The remaining terminals of the two inductances 62 and 64 and of the resistance 65 are connected together and with the common input-output terminal 2 completing the circuit.

Analysis of the circuit of Figure 12 for its complex voltage transfer ratio leads to the following:

(Equation VIII)

$$\frac{l_0}{l_1} = \frac{KP^4}{FP^4 + GP^3 + HP^2 + JP + 1}$$

in which the coefficients of the several terms are given by the expression:

$$F = L^2C^2; \quad G = \frac{2L^2C}{R}; \quad H = 3LC; \quad J = \frac{L}{R}; \quad K = L^2C^2$$

Figure 14:
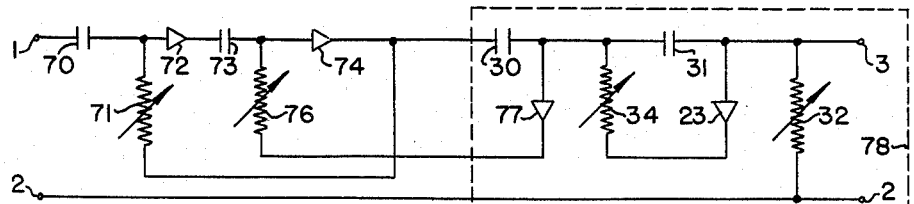
Figure 14 is a schematic representation of an active network within the scope of this invention, exhibiting high pass characteristics.

Figure 14 represents a circuit, incorporating the principles of this invention, which is a high pass analog of the circuit of Figure 10. The terminal 1 and the terminal 2 comprise input terminals while the terminal 3 and the terminal 2 comprise output terminals. The terminal 2 provides a common input and output for the circuit. The capacitor 70 connects the input terminal 1 to a common junction of the resistance 71 and the input side of an active unilateral translating device 72, said device 72 in practice exhibiting low input admittance and low output impedance at the cut-off frequency of the circuit and serving as a repeater of its own input voltage in a manner describable by a dimensionless constant. The capacitor 73 connects between the output side of the device 72 and the input side of a similar device 74 to which is also connected one terminal of a resistance 76. The capacitance 30 connects between a junction of the remaining terminal of the resistance 71 with the output side of the device 74 and the junction of the resistance 34, the capacitance 31 and the input side of an active unilateral translating device 77. The remaining terminal of the capacitance 31 connects to the output terminal 3. The output terminal 3 is also connected to the input side of the active unilateral translating device 23 of which the output side is connected to the remaining terminal of the resistance 34. The resistance 32 connected between the terminals 3 and 2, completes the circuit.

The complex voltage transfer ratio of the circuit of Figure 14 is found upon analysis to be identical in form with and expressible by the same Equation VIII, except for the values of the coefficients appearing as factors in the terms of said Equation VIII. The values of the several coefficients of the circuit of Figure 14 are determined from the circuit parameters and the gain constants of the several translating devices as follows:

$F' = R^4C^4$;
$G' = (5 - k_1k_2 - k_2k_3 - k_4)R^3C^3$;
$H' = (8 - 3k_1k_2 - 2k_2k_3 - 2k_4 + k_1k_2k_4)R^2C^2$;
$J' = (5 - k_1k_2 - k_2k_3 - k_4)RC$;
$K' = k_1k_2R^4C^4$ the coefficients F', G', H', J', K' replacing respectively the coefficients F, G, H, J, and K in Equation VIII in the case of the circuit of Figure 14. The constants $k_1$, $k_2$, $k_3$ and $k_4$ are dimensionless and define the gain of the active unilateral translating devices 72, 74, 77 and 23 respectively.

By suitable choice of the constants $k_1$, $k_2$, $k_3$ and $k_4$, wide latitude is possible in choice of coefficients for Equation VIII permitting adjustment of the circuit of Figure 14 to duplicate the voltage transfer characteristics of the circuit of Figure 12, given above as an example, or such characteristics of other networks, passive or active and composed of the elements of inductance, capacitance and resistance, provided only that the desired voltage transfer characteristic be expressible in the form of Equation VIII. The circuit of Figure 14 thus may be said to permit synthesis of high pass filters with stop band slopes of 24 decibels per octave, while offering a large measure of control of the "damping" or corner characteristic in the cut-off or transition vicinity. Such synthesis may be advantageously employed for securing characteristics of specific form with an ease and flexibility not ordinarily available using passive inductance-capacitance-resistance circuits.

Figure 15:
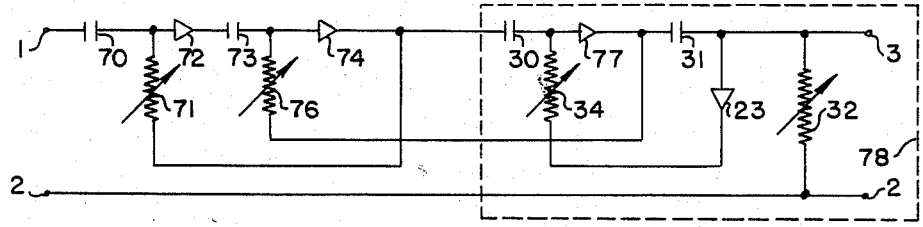
Figure 15 is a schematic diagram showing another form of active network within the scope of this invention, also exhibiting high pass characteristics.

Figure 15 shows an important variation of the circuit of Figure 14 which likewise incorporates and demonstrates the principles of this invention. The description given above for the circuit of Figure 14 applies to Figure 15 with respect to all elements there recited with the exception of the translating device 77 which, in the circuit of Figure 15, is connected between capacitors 30 and 31. Resistor 34 is still connected to the output of translation device 23 and the connection of resistor 76 to the output of translation device 77 is likewise unchanged.

Analysis for the complex voltage transfer constant applying to the circuit of Figure 15 leads to an expression, again of the form of Equation VIII but differing as to the values of the coefficients of the several terms. Coefficients for Equation VIII for the circuit of Figure 15 are as follows:

$F'' = R^4C^4$;
$G'' = (4 - k_1k_2 - k_2k_3 - k_4)R^3C^3$;
$H'' = (6 - 2k_1k_2 - 2k_2k_3 - 2k_4 + k_1k_2k_4)R^2C^2$;
$J'' = (4 - k_1k_2 - k_2k_3 - k_4)RC$;
$K'' = k_1k_2R^4C^4$.

In the foregoing analysis the mechanism of certain preferred forms of the principles of this invention have been demonstrated and equivalences shown relating their performance to selected basic types of filter networks. The foregoing analyses deal throughout with the realization of characteristics familiarly associated with networks employing freely resistance, capacitance and inductance with active circuits employing resistance and capacitance alone. Although the use of capacitance has been found in practice to yield a desired low-pass or high-pass characteristic with the minimum of practical difficulty and cost and is therefore recommended, it has been found that the use of inductance and resistance is preferred where certain other considerations apply. For each and every resistance-capacitance example given above an equivalent analysis may be shown following replacement of the capacitors by inductances (excepting, of course, capacitors used solely for direct-current blocking or other purposes and not to be considered as determining frequency selective properties). The results of such parallel analysis will produce expressions for the complex voltage transfer constants in the several matrices which are identical to those derived for the resistance-capacitance cases in a complementary sense (i.e. the matrix which with capacitance reactance displays low-pass characteristics becomes high-pass upon replacement of the capacitive reactances with inductive reactances, and vice versa).

Figure 19:
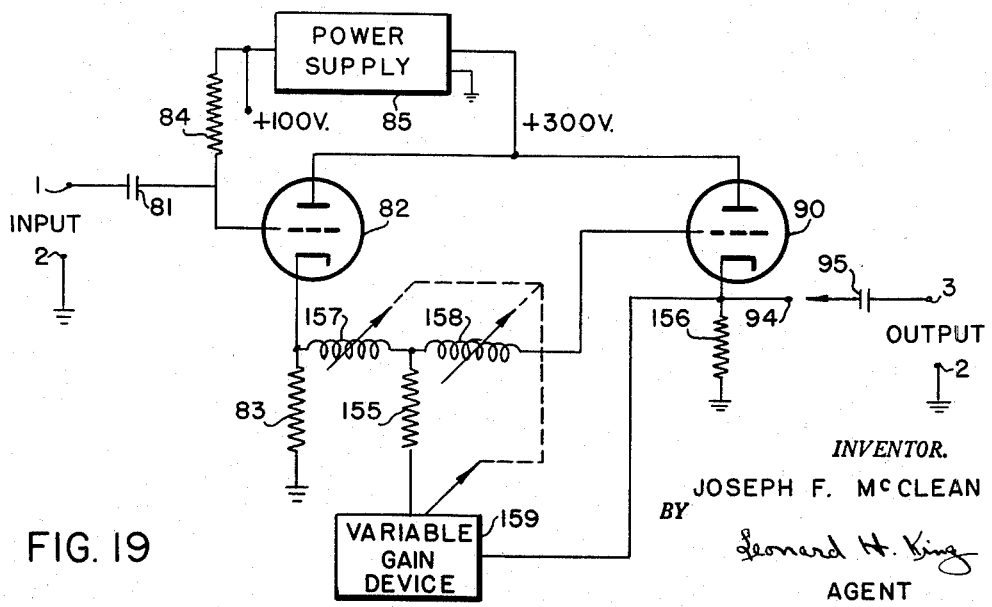
Figure 19 shows schematically a practical apparatus for achieving electronic control of cut-off characteristic by the methods of this invention.

Although other circumstances may make choice of inductive reactance desirable for use in these devices, a particular example is shown in the practical circuit of Figure 19, in which the desirable advantages of electrical tuning may follow from the use of saturable inductors of the type whose exhibited inductance is a function of an externally applied electrical control signal. A commercially available device known as the "Increductor" and manufactured by the C.G.S. Laboratories of Stamford, Conn. is suitable for this application.

A particularly useful group of embodiments of this invention are shown in Figures 10, 11, 14 and 15. These embodiments, in common employ four sections which provide the equivalent of two L-C networks in tandem, however, the effective "Q" of the circuit of my invention may be maintained constant or varied at will whereas as the L-C networks are tuned the "Q" varies in an undesirable fashion. Further, as the L-C circuits are tuned peaking and "ringing" problems are frequently introduced which normally cannot be eliminated in the conventional circuit without changing the "Q" of the coils which is usually physically difficult. In the circuits of my invention, on the other hand, such undesirable "transient behavior" may be eliminated by appropriately adjusting the gain constants of the several translating devices.

It has been pointed out that the circuits of Figure 10, Figure 11, Figure 14 and Figure 15, involving four sections each including a resistance, a capacitance and a translating device, are those most generally useful for the simulation of ordinary filter characteristics. It has also been determined that structures differing from those only in number of sections offer useful properties for solution of special problems and are to be considered within the scope of this invention. For example, it has been found by experiment, that the addition of one section ahead of the first section of any of the said circuits of Figure 10, Figure 11, Figure 14 and Figure 15, and congruent to said first section in circuit connection, will yield a sharp, narrow peak to the filter amplitude response in the vicinity of cut-off and an additional 6 decibel per octave rate of attenuation in the stop band.

It may be implied from the analyses based upon the said circuits of Figure 10, Figure 11, Figure 14 and Figure 15 that each of the four frequency determining resistors is equal in magnitude to each of the other three and, similarly, that each of the four frequency determining reactors is equal in magnitude to each of the other three. Such assumption reduces the complexity of the analysis; however, it has been found experimentally that such equality is neither strictly necessary for satisfactory operation nor universally desirable, useful variations in the response characteristics being available through deliberate departures from equality in some circumstances. In similar manner the components of the devices of Figure 5, Figure 6 and Figure 7 may depart in magnitude from the exact relationships prescribed in the pertinent analyses.

In carrying out this invention it is essential that the phase reversals inserted in each feedback loop by translating devices by either zero or even in number. By way of example, and with reference to Figure 10, assume that at a given instant the input to translation device 52 is negative. If a phase reversal of 180° occurs in each such translation device, then the output of translation device 54 will also be negative at pass band frequencies remote from the cut-off. Accordingly, the feedback signal to the capacitance 51 will be in the same phase sense as if no reversals had occurred in the devices 52 and 54.

The filter circuits of this invention require that the input portions be coupled to the respective external circuits through a low impedance circuit. It is therefore preferred that a cathode follower or other low impedance device be used to couple the filter to the preceding circuit, when such driving circuit does not of itself possess the requisite low impedance.

Figure 16:
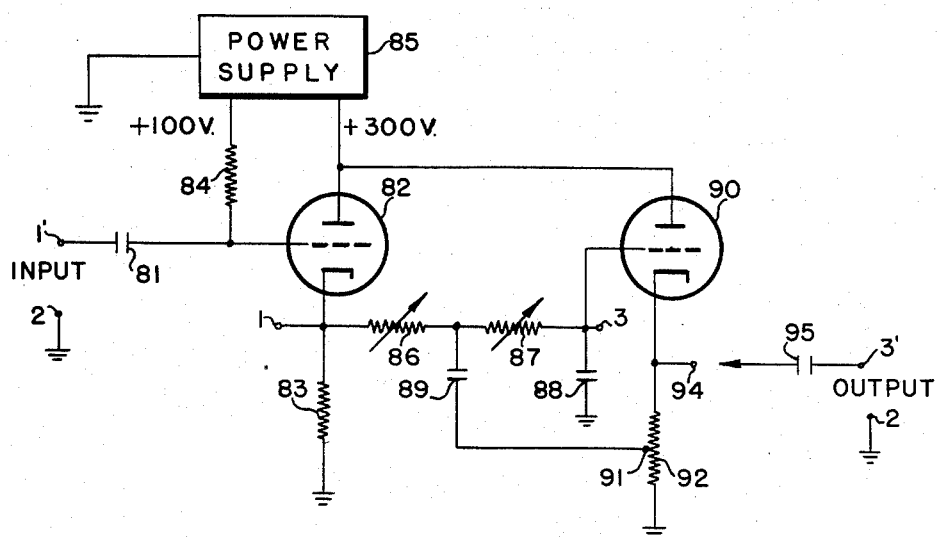
Figure 16 shows schematically a practical apparatus embodying the features shown in Figure 6.

In Figure 16 there is shown a low pass fixed filter of this invention as embodied in a practical circuit. The input signal is introduced at terminals 1 and 2 into a conventional cathode follower comprising a D.-C. blocking capacitor 81, vacuum tube 82, cathode resistor 83, grid resistor 84 and power supply 85. The D.-C. blocking capacitor 81 does not enter into the mechanism of the filter circuit and is selected to offer but negligible reactance at the lowest operating frequency. Resistors 86 and 87 and capacitors 88 and 89 correspond respectively to resistors 25 and 26 and capacitors 27 and 28 of Figure 6. Tube 90 corresponds to translating device 23. The position of tap 91 on cathode resistor 92 is chosen to yield the effective gain constant "k." If the filter is to be coupled to a high or medium impedance (at cut-off frequency) load circuit, then connection may be made through a D.-C. blocking capacitor 95 to terminal 3 which corresponds to terminal 3 of Figure 6. The said blocking capacitor 95 is in no wise esssential to operation of the circuit and under suitable circumstances relating to D.-C. circuit conditions, may be dispensed with. In the event that the capacitors 81 and 95 are so dispensed with, the pass band as a low pass filter may be extended to substantially zero frequency.

Figure 17:
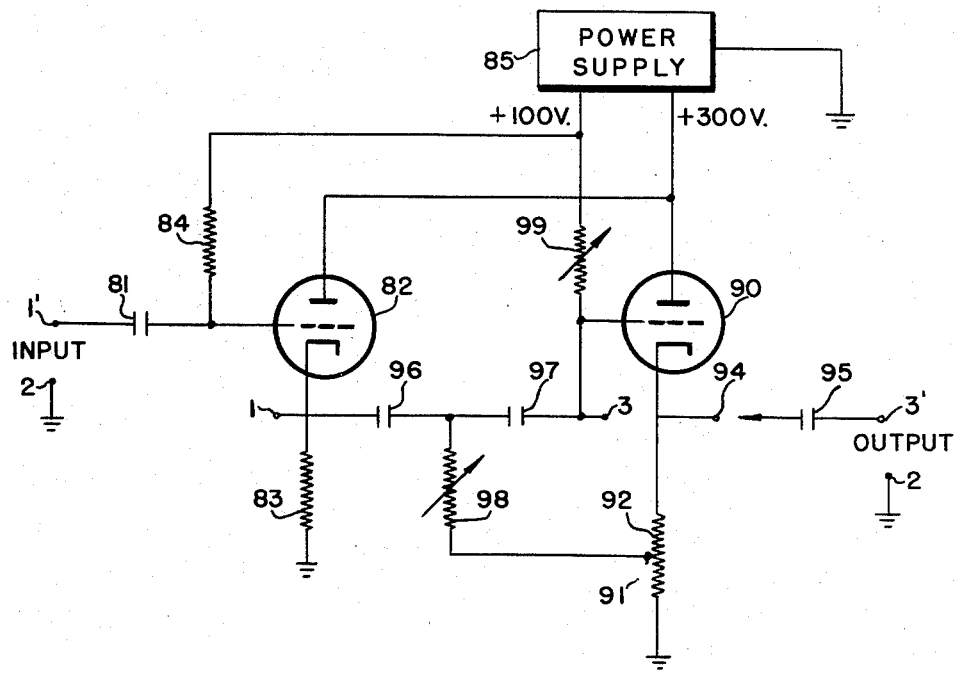
Figure 17 shows schematically a practical apparatus embodying the features shown in Figure 7.

The high pass equivalent of the circuit of Figure 16 is shown in Figure 17 wherein resistors 86 and 87 are replaced by capacitors 96 and 97 and capacitors 89 and 88 are replaced by resistors 98 and 99 respectively. The circuits of Figures 16 and 17 are capable of producing an attenuation of 12 db/octave.

Figure 18:
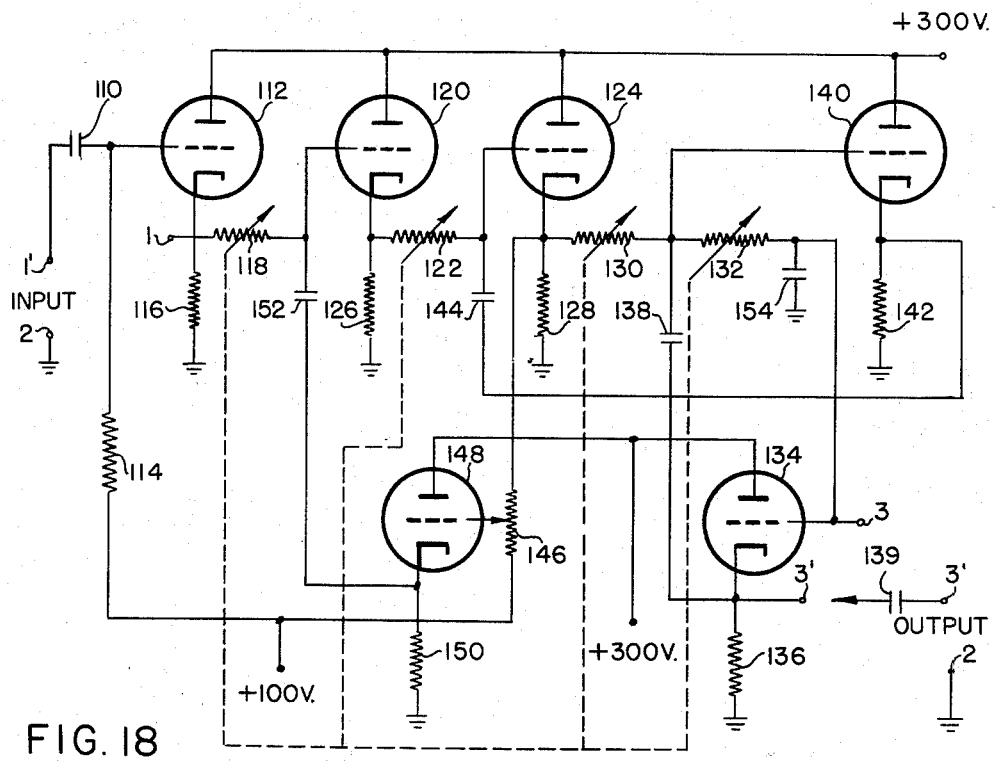
Figure 18 shows a schematic diagram of a preferred apparatus utilizing this invention.

A practical embodiment of the circuit of Figure 10 is shown in Figure 18 which circuit is tunable and provides an attenuation of 24 db/octave.

In this circuit the signal is applied to the circuit between points 1 and 2 by means of a cathode follower stage comprising a D.-C. blocking capacitor 110, vacuum tube 112, grid resistor 114 and cathode resistor 116. The signal is applied between terminal 1' and terminal 2, which may be common ground. Variable resistor 118 couples the output of the cathode follower tube 112 to the grid of cathode follower tube 120. The output from tube 120 is fed through variable resistor 122 to the grid of cathode follower tube 124, resistor 126 serves as a cathode resistor. The output of cathode follower 124 is derived across cathode resistor 128 and fed through cascaded variable resistors 130 and 132 to the grid of cathode follower tube 134. Terminal 3 also connected to said grid of tube 134 may be used to connect the output of the filter to a high impedance (at cut-off frequency) circuit or the output of tube 134 may be taken across cathode resistor 136 as at 3'. A D.-C. blocking capacitor 139 is provided for the earlier stated reasons.

The output of tube 134 is applied through capacitor 138 to the junction of resistors 130 and 132 with the grid of translating device 140. In turn the output of device 140, taken across cathode resistor 142, is fed back into the grid of tube 124 through capacitor 144. A portion of the output of tube 124 is fed through variable resistor 146 to the grid of tube 148. Variable resistor 146 controls the A.-C. potential value at this grid without substantially changing the D.-C. potential value. This controls the "Q" of the filter. The output of tube 148, to which the variable arm of resistor 146 is connected, is in turn applied across cathode resistor 150 to the grid of tube 120 through capacitor 152. Shunting capacitor 154 completes the circuit. The four variable resistors, 118, 122, 130 and 132 may be coupled together so that they may be simultaneously varied for purposes of tuning. Tuning may likewise be achieved by simultaneous variation of the capacitors 152, 144, 138 and 154, by interchanging the resistors 118, 122, 130, 132 with capacitors 152, 144, 138 and 154.

A practical circuit for a low-pass filter utilizing the principles of this invention and employing inductive and resistive elements is shown in Figure 19. In this circuit the input signal is introduced at terminals 1 and 2 into a conventional cathode follower comprising D.-C. blocking capacitor 81, vacuum tube 82, cathode resistor 83, grid resistor 84 and power supply 85. The D.-C. blocking capacitor 81 does not enter into the mechanism of the filter circuit and is selected to offer but negligible reactance at the lowest operating frequency. Inductances 157 and 158 are connected in series between the cathode of vacuum tube 82 and the control grid of vacuum tube 90, the resistance 155, being connected between the junction of said inductances and the output of the variable gain device 159, whose input is connected to the cathode of the vacuum tube 90, which latter cathode is connected to the terminal 94 and the resistance 156. The other terminal of the resistance 156 is connected to the common, or ground, terminal 2. The plates of the vacuum tubes 82 and 90 are connected to the power supply 85. Output signals may be taken from the terminals 3 and 2, in which case the blocking capacitance 95, selected to introduce a negligible reactance at the lowest operating frequency, prevents passage of direct current between the filter and the load circuit.

The reactances 157 and 158 may be mechanically variable or may be saturable reactors, of which the earlier mentioned commercially available "Increductor" is representative. Filter cut-off frequency adjustment is secured by variation of the effective electrical magnitudes of the inductances 157 and 158 so as to maintain their ratio nominally constant. The variable gain device, 159, is represented in block form since it may take one of several simple forms readily providable by one versed in the electronic art and, furthermore, is not essential to operation of the circuit, being replaceable by a fixed tap on the cathode resistor 156, or by other suitable fixed gain control. When the change of inductance brought about to tune the filter to a new cut-off frequency is accomplished by a change of inductor "Q," the variable gain device 159, which, considered with the vacuum tube 90, comprises the translating device described in the preceding circuit analysis, serves to permit compensation of the overall circuit "Q," therefore avoiding change in pass band shape with tuning. By suitable electrical interconnection of the control circuit of the device 159, with that of the saturable reactors, a filter characteristic of uniform shape may be secured over a wide range of cut-off values. The method of tuning and of "Q" compensation described above is equally applicable to the other circuits of this invention. By way of example, a high-pass equivalent would be obtained by interchanging resistor 155 with inductance 157 and resistor 156 with inductance 158.

It is common practice to tune circuits by physically varying inductive or capacitive elements. This practice has some undesirable features, for example, if precision is required, the elements become costly. Further, they are in general cumbersome. It is therefore pointed out with particularity that the circuits of this invention may be tuned by varying only resistances. Those familiar with the electronic arts will appreciate the many attendant advantages of this feature. One such advantage is the relative ease with which a plurality of resistors may be "tracked" (e.g. simultaneously varied while maintaining a predetermined relationship).

The filters of this invention may be employed as fixed or tunable oscillators by suitably interconnecting the output terminal 3 with the input terminal 1. The low pass configurations are most advantageous for this use, since the suppression of harmonic frequency components results in a generated wave form of high purity.

In certain circumstances, namely where combinations of the translating device gain factors permit the transfer ratio expression to approach infinity, oscillator performance may also be obtained by the expedient of providing a low impedance across the prescribed input connections.

The adjusted values of the gain constants in the several translating devices differ for oscillator operation from those of the same circuit used as a filter by appreciable margins. Thus the circuit capabilities for oscillator service reflect in no wise upon their stabilities as filters.

While I have shown the various impedance elements forming part of the networks of this invention as variable it is to be understood that they may be set at a selected value or that fixed elements be substituted with a resulting saving in cost if the apparatus is to be employed at but a given frequency.

In particular applications it is contemplated that inductances may be substituted for the capacitors in the filter network.

Thus while I have disclosed the best mode presently contemplated by me for carrying out the invention it is to be understood that changes may be made without departing from the spirit of the invention as for example by substituting other suitable translating devices for the triode tubes shown for purposes of illustration.

What I claim as new is:

1. A frequency sensitive apparatus comprising in combination: a first two-terminal passive impedance element; a second two-terminal passive impedance element having one terminal connected to one of the terminals of said first impedance element to form a common junction; a third two-terminal passive impedance element having one terminal connected to the said common junction; a fourth two-terminal passive impedance element having one terminal connected to the other terminal of said second impedance element; an amplifier type translating device provided with a two-terminal high impedance input circuit and a two-terminal relatively low impedance output circuit, said high impedance input circuit having one terminal connected to the said other terminal of said second impedance element, and said low impedance output circuit having one terminal connected to the other terminal of said third impedance element, the other said terminals of said translating device being connected to the other terminal of said fourth impedance element; means to introduce an input signal between the other terminal of said first impedance element and the said other terminal of said fourth impedance element; and means to derive an output signal from the said other terminal of said second impedance element and the said other terminal of said fourth impedance element, wherein said first and said second impedance elements are of the same first type, and said third and said fourth impedance elements are of the same second type, but said first and said second types are different.

2. The apparatus of claim 1, wherein said first and second impedance elements are capacitors, and said third and fourth impedance elements are resistors.

3. The apparatus of claim 1, wherein said first and second impedance elements are resistors, and said third and fourth impedance elements are capacitors.

4. The apparatus of claim 1, wherein said signal introducing means comprises a cathode follower circuit.

5. The apparatus of claim 1, wherein one of said types of impedance elements comprises variable capacitors arranged to be simultaneously varied while maintaining constant the ratio between their magnitudes.

6. The apparatus of claim 1, wherein one of said types of impedance elements comprises variable resistors arranged to be simultaneously varied while maintaining constant the ratio between their ohmic values.

7. The apparatus of claim 1, wherein one of said types of impedance elements comprises variable inductances arranged to be simultaneously varied while maintaining constant the ratio between their magnitudes.

8. The apparatus of claim 7, wherein said inductances are varied by variation of an electrical control signal applied to said inductances.

9. A frequency selective apparatus comprising in combination: an $n$ quantity of two-terminal passive impedance elements of a first type and an $n$ quantity of two-terminal passive impedance elements of a second type, one of said types being a resistance; one of each first type of element having a terminal connected to a terminal of one of said second type, so as to provide a plurality of common junctions; an $n$ quantity of amplifier type translating elements each having an input and an output circuit; an $n$ quantity of said translating elements having their said respective input circuits connected respectively to each of said common junctions and an $n-1$ quantity of said output circuits of said translating devices each connected respectively to the other said terminal of an impedance element of said first type other than the element to which the input of the particular device is connected so as to form a cascade; the other said terminal of each of $n-1$ of said first type of impedance being connected to the said output of the particular one of said translating devices which is second in cascade with respect to the said other terminal of said particular first type of impedance device, so as to leave one impedance of the said first type and one impedance of the said second type each having but one of its said two terminals connected to one of the said translating devices; means for introducing a signal to said unconnected terminals of said impedances; and means for deriving a signal across the particular said impedance of the first type having one said terminal not connected to any of the said translating devices.

10. The apparatus of claim 9 wherein one of said first and second types of impedances comprise variable capacitances.

11. The apparatus of claim 9 wherein means are provided for varying the amplitude of the signal derived from a selected number of said $n$ quantity of translating elements and applied to the said other terminal of a said impedance of said first type.

12. A frequency selective apparatus comprising in combination: an $n$ quantity of two-terminal impedance elements of a resistance type and an $n$ quantity of two-terminal elements of a capacitance type, one of each resistance type of element having a terminal connected to a terminal of one of said capacitance type, so as to provide a plurality of common junctions; an $n$ quantity of amplifier type translating devices each having an input and an output circuit; an $n$ quantity of said translating elements having their said respective input circuits connected respectively to each of said common junctions and an $n-1$ quantity of said output circuits of said translating devices connected each respectively to the other said terminal of an impedance element of said resistance type other than the element to which the input of the particular device is connected so as to form a cascade; the other said terminal of each of $n-1$ of said resistance type of impedance being connected to the said output circuit of the particular one of said translating devices which is second in cascade with respect to the said other terminal of said particular resistance type of impedance device, so as to leave one impedance of the said resistance type and an impedance of the said capacitance type each having but one of its said two terminals connected to one of the said translating devices; means for introducing a signal to said unconnected terminals; and means for deriving a signal across the particular said impedance of the resistance type having one said terminal not connected to any of the said translating devices.

13. The apparatus of claim 12 wherein $n=4$.

14. A frequency sensitive apparatus comprising in combination: an $n$ quantity of two-terminal impedance elements of a capacitance type and an $n$ quantity of two-terminal elements of a resistance type; one of each capacitance type of element having a terminal connected to a terminal of one of said resistance type, so as to provide a plurality of common junction; an $n$ quantity of translating elements each having an input and an output circuit; an $n$ quantity of said translating elements having their said respective input circuits respectively connected to each of said common junction and an $n-1$ quantity of said output circuits of said translating devices connected each respectively to the other said terminal of an impedance element of said capacitance type other than the element to which the input of said particular device is connected so as to form a cascade; the other said terminal of $n-1$ of said capacitance type of impedance being connected to the said output circuit of the particular one of said translating devices which is second in cascade with respect to the said other terminal of said particular capacitance type of impedance device, so as to leave one impedance of the said capacitance type and one impedance of the said resistance type each having but one of its said two terminals connected to one of the said translating devices; means for introducing a signal to said unconnected terminals of said impedances; and means for deriving a signal across the particular said impedance of the capacitance type having one said terminal not connected to any of the said translating devices.

15. A frequency selective apparatus comprising in combination: a plurality of two-terminal impedances of a resistance type and a plurality of two-terminal impedances of a capacitance type having one said terminal of each resistance type connected to one said terminal of said capacitance type so as to form a plurality of common junctions; a plurality of amplifier type translating devices having a high impedance input and a low impedance output circuit; each of said input circuits being connected to one of said common junctions; a plurality of said resulting sections, comprising an impedance of the said resistance type, an impedance of the said capacitance type and a translating device having a said common connection, connected so that said impedance of said resistance type and said translating devices are in cascade and the other terminal of said capacitance type impedance is connected to the output circuit of the second translating device following in cascade with the terminal of the said capacitance type impedance device connected to a said common junction; a terminating section of said plurality of cascaded sections having the output circuit of its translating device connected to the other said terminal of the impedance of said capacitance type of the preceding section, its other said terminal of said resistance type of impedance connected to said common junction of said preceding section; means for introducing a signal to the other said terminal of said resistance type impedance of the first of said cascaded sections and the other said terminal of said capacitance type impedance of said terminating section; and means for deriving a signal across the said capacitance type impedance of said terminating section.

16. A frequency selective apparatus comprising in combination: a plurality of two-terminal impedances of a capacitance type and a plurality of two-terminal impedances of a resistance type having one said terminal of each capacitance type connected to one said terminal of said resistance type so as to form a plurality of common junctions; a plurality of amplifier type translating devices having an input and an output circuit; each of said input circuits being connected to one of said common junctions; a plurality of said resulting sections, comprising an impedance of the said capacitance type, an impedance of the said resistance type and a translating device having a said common connection, connected so that said impedance of said capacitance type and said translating devices are in cascade and the other terminal of said resistance type impedance is connected to the output circuit of the second translating device following in cascade with the terminal of the said resistance type impedance device connected to said common junction; a terminating section of said plurality of cascaded sections having the output circuit of its translating device connected to the other said terminal of the impedance of said resistance type of the preceding section, its other said terminal of said capacitance type of impedance connected to said common junction of said preceding section; means for introducing a signal to the other said terminal of said capacitance type impedance of the first of said cascaded sections and the other said terminal of said resistance type impedance of said terminating section; and means for deriving a signal across the said resistance type impedance of said terminating section.

17. A frequency sensitive apparatus comprising in combination: a first two-terminal impedance; a second two-terminal impedance having one terminal connected to one of said terminals of said first impedance element so as to provide a common junction; a third two-terminal impedance element having one terminal connected to said common junction; an amplifier type translating device having a high impedance input circuit connected to the other said terminal of said second impedance element and a low impedance output circuit connected to the other said terminal of said third impedance; a fourth two-terminal impedance element having one terminal connected to the other said terminal of said second two-terminal impedance; wherein said first and second impedance elements are inductances and said third and fourth impedance elements are resistances; means to introduce an input signal between the other said terminal of said first impedance element and the other said terminal of said fourth impedance element; and means to derive an output signal from the other of said terminals of said second impedance element and said other terminal of said fourth impedance element.

18. A frequency sensitive apparatus comprising in combination: a first two-terminal impedance; a second two-terminal impedance having one terminal connected to one of said terminals of said first impedance element so as to provide a common junction; a third two-terminal impedance element having one terminal connected to said common junction; an amplifier type translating device having a high impedance input circuit connected to the other said terminal of said second impedance element and a low impedance output circuit connected to the other said terminal of said third impedance; a fourth two-terminal impedance element having one terminal connected to the other said terminal of said second two-terminal impedance; wherein said first and second impedance elements are resistances and said third and fourth impedance elements are inductances; means to introduce an input signal between the other said terminal of said first impedance element and the other said terminal of said fourth impedance element; and means to derive an output signal from the other of said terminals of said second impedance element and said other terminal of said fourth impedance element.

19. The apparatus of claim 9 wherein $n=4$.

20. The apparatus of claim 11 wherein said varying means comprises a cathode follower circuit including a vacuum tube provided with a control grid and a cathode; means to apply a portion of a signal derived from one of said translating elements to said control grid; means to connect said cathode to said other terminal of a said impedance of said first type, wherein said means to apply a portion of said signal comprises a resistance voltage divider provided with a tap and connected in series between the output circuit of said one of said translating devices and a source of D.C. potential and said tap connected to said grid.

References Cited in the file of this patent

UNITED STATES PATENTS

| | | |
|---|---|---|
| 2,728,053 | Bangeret | Dec. 20, 1955 |
| 2,735,902 | Vose | Feb. 21, 1956 |
| 2,756,283 | Bach | July 24, 1956 |
| 2,788,496 | Linvill | Apr. 9, 1957 |
| 2,829,313 | Moe | Apr. 1, 1958 |